Jan. 15, 1952  E. L. THOMAS  2,582,660
DISPENSING HOLDER FOR LIQUID CONTAINERS WITH
MEANS FOR PUNCTURING SAID CONTAINERS
Filed Feb. 3, 1949  2 SHEETS—SHEET 1
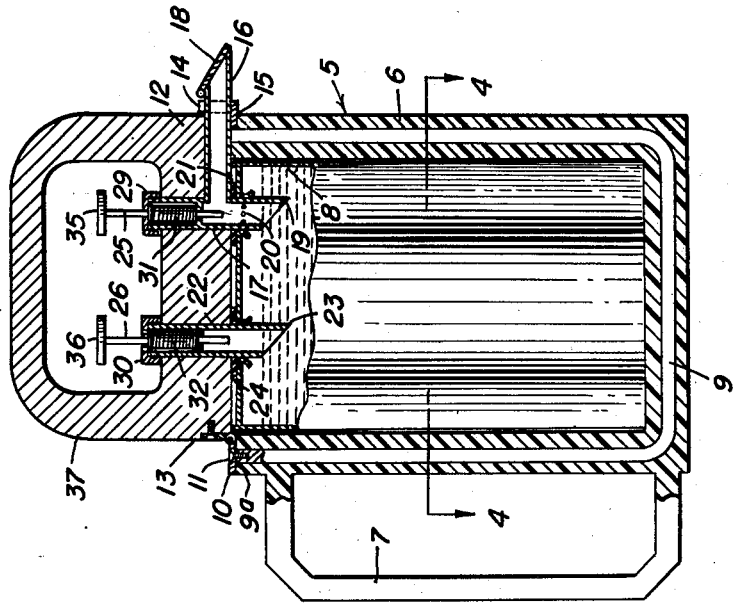
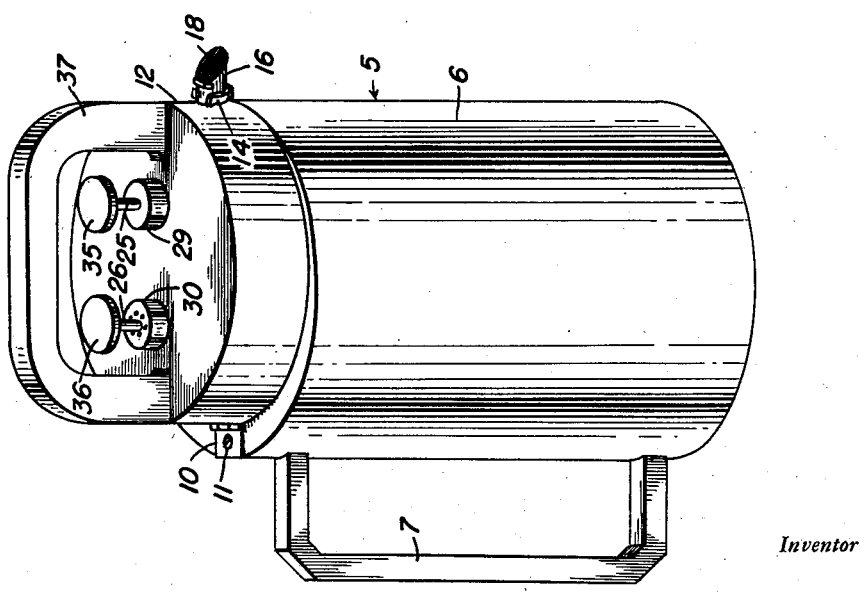
Inventor
Ezekiel L. Thomas
By *Clarence A. O'Brien
and Harvey B. Jackson*
Attorneys Jan. 15, 1952 E. L. THOMAS 2,582,660
DISPENSING HOLDER FOR LIQUID CONTAINERS WITH
MEANS FOR PUNCTURING SAID CONTAINERS
Filed Feb. 3, 1949 2 SHEETS—SHEET 2
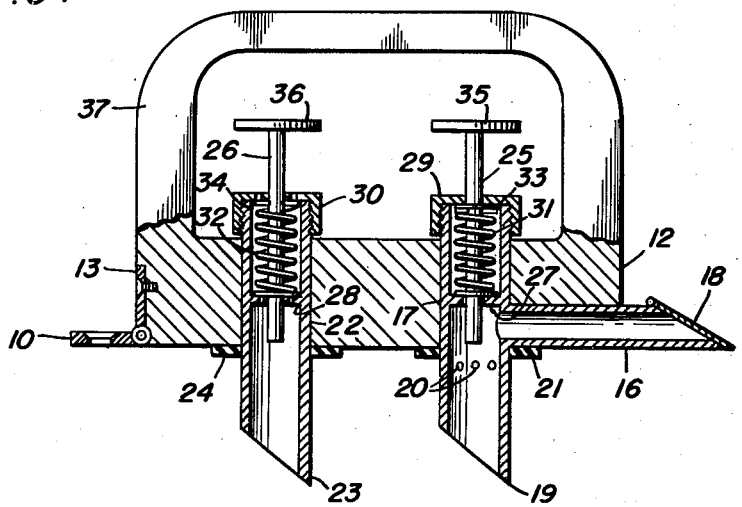
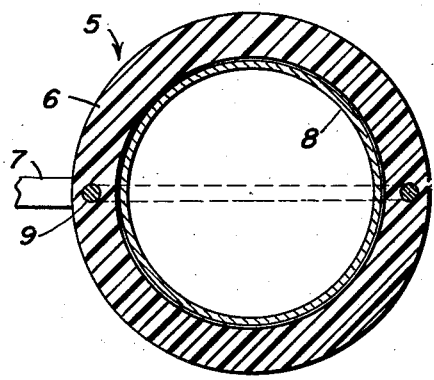
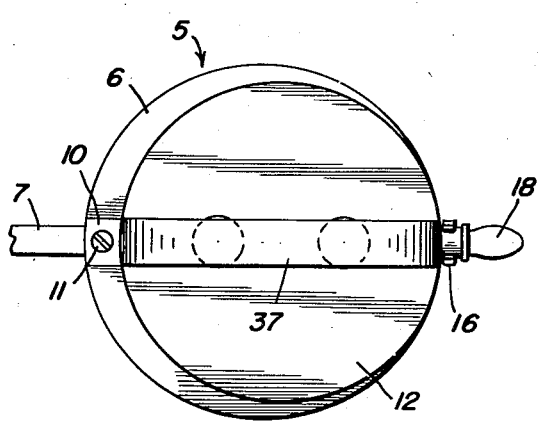
Inventor
Ezekiel L. Thomas
By *Clarence A. O'Brien and Harvey B. Jacobson*
Attorneys

Patented Jan. 15, 1952

2,582,660

UNITED STATES PATENT OFFICE 2,582,660

DISPENSING HOLDER FOR LIQUID CONTAINERS WITH MEANS FOR PUNCTURING SAID CONTAINERS

Ezekiel L. Thomas, Los Angeles, Calif., assignor of forty-nine per cent to Clara Thomas, Los Angeles, Calif.

Application February 3, 1949, Serial No. 74,373

4 Claims. (Cl. 222—83.5)

This invention relates to a device for encasing and holding a can of evaporated milk or the like, and for puncturing the top of the can to facilitate pouring of the contents therefrom.

The primary object of the present invention is to provide a device of the above kind which is simple in construction, easy to use, and efficient in use.

The exact nature of the present invention, as well as other objects and features thereof, will become apparent from the following description when considered in connection with the accompanying drawings, in which:

Figure 1 is a perspective view of a dispensing holder embodying the present invention;

Figure 2 is a view thereof partly in side elevation and partly in central vertical section;

Figure 3 is an enlarged view, partly in side elevation and partly in section, of the cover forming part of the device shown in Figure 1, together with associated parts;

Figure 4 is a horizontal section taken on the line 4—4 of Figure 2;

Figure 5 is a top plan view of the device, partly broken away.

Referring in detail to the drawings, 5 indicates a cup consisting of an open-top cylindrical container 6 molded of plastic material with relatively thick walls and provided with a rear handle 7, said container being of a size to closely receive and encase the bottom and cylindrical walls of a sealed can 8 containing evaporated milk or other liquid. Embedded in and reinforcing the container 6 is a U-shaped yoke, having its intermediate portion disposed diametrically of the bottom wall of said container and its end portions vertically disposed in diametrically opposite or front and rear portions of the cylindrical wall of said container. The rear end portion of yoke 9 terminates at the bottom of a notch 9a provided in the upper edge of the cylindrical wall of container 6 and has the leaf 10 of a hinge detachably anchored thereto by suitable means, such as a screw 11 passed through the hinge leaf and inserted into an axial bore of the yoke end, said leaf being seated in said notch.

A thick circular closure disk 12 is provided for the top of the container 6 and is attached at its edge to the other leaf 13 of said hinge so that the closure disk may swing vertically between open and closed positions. The cover or closure disk may be held closed by suitable means, such as a spring clasp 14 secured on the projecting end of a bracket 15 carried by the terminal of the front end portion of yoke 9 and arranged to receive and releasably grip the projecting end of a horizontal pouring spout 16 which is radially embedded in the front marginal portion of closure disk 12 and projects outwardly beyond the edge of the latter from the intermediate portion of a vertical puncturing and milk outlet tube 17. The outer end of spout 16 is preferably provided with a self-closing closure flap 18.

The puncturing and outlet tube 17 is secured to and extends through the cover 12 and has a projecting lower end 19 which is sharp pointed to puncture the top of the can 8 near one side thereof when the cover or closure 12 is closed. Near its lower end, the tube 17 has perforations 20 which will be located directly at the underside of the can top when said tube has punctured the latter by closing the cover 12, thereby providing for completely dispensing the contents of the can. A washer or gasket 21 is provided on the tube 17 and against the bottom surface of cover 12 to prevent leakage of liquid from the can about said tube.

An air inlet and puncturing tube 22 is also secured to and extends through the cover 12 in spaced relation to tube 17, and has a projecting lower end 23 which is sharp pointed to puncture the top of the can when the cover 12 is closed. A washer or gasket 24 on the tube 22 serves the same purpose for the latter as gasket 21 serves for the tube 17.

Spring elevated and manually depressable reciprocable plungers 25 and 26 are mounted in the tubes 17 and 22 for use in clearing the lower ends of the latter in case they become clogged by coagulation of milk or the like therein from the can 8. These plungers are slidable through guides 27 and 28 in the tubes 17 and 22 and through caps 29 and 30 secured on the upper ends of said tubes, compression springs 31 and 32 being provided on the plungers between the guides 27 and 28 and cross pins or abutments 33 and 34 carried by said plungers above said guides. The plungers have finger pieces 35 and 36 on their upper ends, and the guide 28 and cap 30 are perforated to admit air to and permit the flow of the air through the tube 22 into the can so that the fluid may be freely poured from the can through tube 17 and spout 16. A suitable gasket may be used to prevent the liquid from passing the guide 27 into the upper part of tube 17.

Cover 12 preferably has a U-shaped handle 37 for use in opening and closing the same, the intermediate portion of said handle overlying the plungers but being sufficiently spaced from the latter to permit access thereto.

In use, the cover 12 is opened and may be removed or turned around by removing or loosening the screw 11 to permit insertion of the can 8 into the container 6. The cover is then closed so as to cause the tubes to puncture the can top, the cover being held closed by clasp 14. By properly tilting the container 6 while holding it by means of the handle 7, the closure 18 gravitates to open position and the fluid may be poured from the can through tube 17 and spout 16 in a well known manner, air being admitted to the can through tube 22 as the fluid is poured therefrom. When the can is emptied, it may be removed after opening the cover 12 to allow insertion of a filled can into the container. When the device is brought to an upright position, the closure 18 for spout 16 automatically closes by gravity to exclude dirt, etc.

From the foregoing description, it is believed that the construction, operation and advantages of the present invention will be readily understood and appreciated by those skilled in the art. Modifications and changes in details of construction are contemplated, such as fairly fall within the spirit and scope of the invention as claimed.

Having described the invention, what is claimed as new is:

1. A dispensing holder for evaporated milk cans or the like, including a can-receiving container, reinforcing means embedded in the walls of said container, a hinged cover on the container, can top puncturing air inlet and milk outlet tubes carried by the cover, a pouring spout carried by the cover and communicating with the outlet tube, and spring elevated manually depressable plungers carried by said tubes and operable therein to clear the same of coagulated milk obstructing the passages thereof.

2. The construction defined in claim 1, in combination with a spring clasp carried by the container and anchored to said reinforcing means and arranged to receive and grip said spout to releasably hold the cover closed.

3. In a dispensing holder for evaporated milk cans or the like, a molded plastic can-receiving container of cylindrical form, a U-shaped yoke embedded in said container and having its intermediate portion disposed diametrically of the bottom of said container and its end portions vertically disposed in diametrically opposite portions of the cylindrical wall of said container, a cover for said container, and a hinge having one leaf secured to one terminal of said yoke and the other leaf secured to the edge of the cover.

4. The construction defined in claim 3, in combination with a pouring spout carried by the cover, and a spring clasp carried by the other terminal of said yoke and arranged to receive and grip said spout to releasably hold the cover closed.

EZEKIEL L. THOMAS.

REFERENCES CITED

The following references are of record in the file of this patent:

UNITED STATES PATENTS

| Number | Name | Date |
|---|---|---|
| 651,313 | Lowe | June 5, 1900 |
| 779,798 | Palm | Jan. 10, 1905 |
| 1,307,908 | Laverman | June 24, 1919 |
| 1,475,903 | Urtasun | Nov. 27, 1923 |
| 1,521,430 | Campbell | Dec. 30, 1924 |